United States Patent [19]

Spangenberg

[11] 3,725,539
[45] Apr. 3, 1973

[54] PREPARATION OF ALKALINE EARTH METAL TITANATE

[75] Inventor: Stanley F. Spangenberg, Midland, Mich.

[73] Assignee: The Dow Chemical Company, Midland, Mich.

[22] Filed: Apr. 28, 1971

[21] Appl. No.: 138,340

[52] U.S. Cl. ................................................423/598
[51] Int. Cl. ..........................................C01g 23/00
[58] Field of Search....................23/51 R; 423/598

[56] References Cited

FOREIGN PATENTS OR APPLICATIONS 790,093  2/1958  Great Britain........................23/51 R
530,584  12/1940  Great Britain........................23/51 R
853,784  11/1960  Great Britain........................23/51 R

*Primary Examiner*—Herbert T. Carter
*Attorney*—Griswold & Burdick, Stephen S. Grace and Lloyd S. Jowanovitz

[57] ABSTRACT

An alkaline earth metal titanate is prepared by reacting an aqueous solution of titanium tetrachloride, an alkaline earth metal anion source, and a hydroxyl ion source to produce an alkaline earth metal titanate precipitate which is separated from the residual aqueous solution.

7 Claims, No Drawings

PREPARATION OF ALKALINE EARTH METAL TITANATE

BACKGROUND OF THE INVENTION

Alkaline earth metal titanates have been prepared by calcining a mixture of titanium dioxide and alkaline earth metal carbonate at elevated temperature. These titanates have also been prepared by high temperature calcination of mixed oxalates, alkoxides, citrates and other chelates (e.g. U.S. Pat. No. 2,758,911). British Pat. No. 790,093 discloses a method of preparing a barium titanate by reacting barium chloride, titanium tetrachloride, ammonium hydroxide and ammonium carbonate to form a barium carbonate-titanium hydroxide precipitate which is heated to form barium titanate, water and carbon dioxide.

An object of the present invention is to provide a method of preparing alkaline earth metal titanates.

THE INVENTION

The method of the present invention comprises reacting, in an aqueous solution, titanium tetrachloride, an alkaline earth metal anion source, and a hydroxyl ion source to produce an alkaline earth metal titanate precipitate and separating this precipitate from the residual aqueous solution. The amount of the reactants, i.e. titanium tetrachloride, alkaline earth metal anion source, and hydroxyl ion source, are sufficient to provide a concentration in the aqueous solution of at least about 0.01 molar titanium ion, about 0.01 molar alkaline earth metal ion and about 0.02 molar hydroxyl ion. This method employs easily purifiable starting materials so that product purity can be enhanced and can be carried out at room or elevated temperature in relatively short reaction times.

The term "alkaline earth metal anion source" refers to any water soluble, alkaline earth metal chloride, hydroxide or oxide, e.g., barium chloride, strontium chloride, barium hydroxide, strontium hydroxide or barium oxide, or other water soluble alkaline earth metal salt. The term "hydroxyl ion source" referred to any water soluble alkali metal or alkaline earth metal hydroxide, e.g., sodium hydroxide, potassium hydroxide, barium hydroxide.

Thus, it is noted from the above definitions that in a given instance, if desired, the alkaline earth metal anion source can also serve in whole or in part as the source of hydroxyl ion.

In carrying out the method of the present invention the prescribed reactants are admixed in a suitable vessel at room or elevated temperature, e.g. 50° to 100°C. The reactants can be added as solids or one or more can be premixed in aqueous solution prior to addition to the other constituents. Reaction starts almost immediately upon mixing of the reactants and is completed within a matter of minutes depending on the amount of materials present. The reaction products are an insoluble alkaline earth metal titanate, water and a soluble chloride salt. For example, if titanium tetrachloride and barium hydroxide are the reactants, the reaction product will be barium titanate, barium chloride and water. The reactants are added in such amounts as to provide the minimum concentrations prescribed above. Preferably, the reactants are present in amounts to provide a concentration of at least about 0.02 molar titanium ion, 0.02 molar alkaline earth metal ion and about 0.04 molar hydroxyl ion.

Barium titanate samples made from the present method had a particle size on the order of one tenth that of commercial grade barium titanate. The following examples are illustrative of the method of the present invention.

EXAMPLE 1

A 25 milliliter aliquot of distilled titanium tetrachloride was cooled to 0°C. 100 Milliliters of water was slowly added to the cooled titanium tetrachloride. The resultant clear, colorless solution was transferred to a 200 milliliter volumetric flask and diluted to volume. A 15 milliliter aliquot of the titanium tetrachloride solution was added dropwise to 53.6 grams of barium hydroxide octahydrate ($Ba(OH)_2 \cdot 8H_2O$) dissolved in 750 milliliters of water at 80°C. A white, solid precipitate was allowed to settle over a period of several minutes. The precipitate was separated from the mother liquor and the solids washed with water, centrifuged and dried at 130°C for 12 hours. The material was identified by x-ray diffraction as barium titanate.

EXAMPLE 2

The same procedure as described in Example 1 was repeated with the reactants being admixed at room temperature instead of 80°C. X-ray diffraction again revealed the precipitated material to be essentially barium titanate.

EXAMPLE 3

Carrying out the same procedure as in Example 1 the titanium tetrachloride solution was added to 41.1 grams of strontium hydroxide octahydrate ($Sr(OH)_2 \cdot 8H_2O$) dissolved in 750 milliliters of water at 80°C. The resulting solid was separated from the residual aqueous solution by centrifugation, dried at 130°C for 12 hours and identified as strontium titanate by x-ray diffraction.

EXAMPLE 4

A solution of sodium hydroxide was added to a solution of 26.15 grams barium oxide (BaO) in 750 ml. of water until the first precipitate of $Ba(OH)_2 \cdot 8H_2O$ was observed. The solution was filtered and then 15 ml. of the titanium tetrachloride solution of Example 1 was added to it slowly at 80°C. The resulting precipitate was separated by centrifugation, washed, dried and identified as barium titanate by x-ray diffraction.

What is claimed is:

1. A method of preparing barium or strontium titanate which comprises:
   a. reacting, in an aqueous solution at a temperature from about room temperature to about 100°C., a mixture consisting of titanium tetrachloride, a barium or strontium ion source and a hydroxyl ion source, to produce barium or strontium titanate precipitate, the amount of said reactants being sufficient to provide a concentration in the aqueous solution of at least about 0.01 molar titanium ion, about 0.01 molar barium or strontium ion, and about 0.02 molar hydroxyl ion; and
   b. separating the barium or strontium titanate from the residual aqueous solution.

2. The method of claim 1 wherein the barium ion source and the hydroxide ion source are barium hydroxide.

3. The method of claim 1 wherein the strontium ion source and the hydroxyl ion source are strontium hydroxide.

4. The method of claim 1 wherein the barium ion source is barium oxide and the hydroxyl ion source is sodium hydroxide.

5. The method of claim 1 wherein the barium ion source is barium hydroxide and the hydroxyl ion source is sodium hydroxide and barium hydroxide.

6. The method of claim 1 wherein the reactants are present in amounts to provide a concentration of at least about 0.02 molar titanium ion about 0.02 molar barium or strontium ion, and about 0.04 molar hydroxyl ion.

7. The method of claim 1 wherein the reaction is carried out at a temperature within the range of from about 50° to about 100°C.

* * * * *